Sept. 22, 1964  G. E. NICHOLS  3,149,816
CALENDAR MOUNT

Filed Dec. 19, 1961  2 Sheets-Sheet 1

INVENTOR.
Gordon E. Nichols
BY
Roberts, Cushman & Grover
ATT'YS

Sept. 22, 1964 G. E. NICHOLS 3,149,816
CALENDAR MOUNT
Filed Dec. 19, 1961 2 Sheets-Sheet 2

3,149,816
CALENDAR MOUNT

Gordon E. Nichols, Middleboro, Mass., assignor to Winthrop-Atkins Co., Inc., Middleboro, Mass., a corporation of Massachusetts
Filed Dec. 19, 1961, Ser. No. 160,473
4 Claims. (Cl. 248—465)

This invention relates to easel-type mounts and more particularly to an improved mount in which the supporting surface is prominently located so as to display the calendar pad, or the like, more effectively; to provide a mount designed to augment its perspective and hence enhance its appearance; to provide a mount which may optionally be used in one or the other of two different positions and, in one of the positions, provides support for a writing implement; and to provide a mount which may be shipped flat, easily set up, is stable, durable and relatively inexpensive to manufacture.

As herein illustrated, the mount comprises hinged supports, the components of which are held in angular relation to each other by a brace and leg carried by the respective components, and a forwardly displaced faceboard spaced from one of the components for displaying a calendar pad, the faceboard being hingedly connected to the two components, respectively.

The invention will now be described in greater detail with reference to the accompanying drawings wherein.

Figure 1:
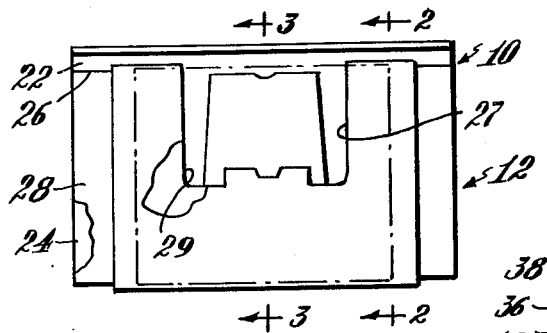
FIG. 1 is a plan view of one form of the mount set up in one of two possible positions.

Referring to the drawings, the mount comprises a hinged support made up of components which are held in angular relation to each other by a brace and leg which are interengageable to hold one component in an upright, rearwardly inclined position and the other sloping downwardly and forwardly from the lower edge of the one component, and a faceboard spaced from and parallel to one of the components for displaying a calendar pad, or the like, and connected to the respective components by hinge means.

In the specific form of the invention shown in FIGS. 1 to 7 inclusive, the compoent 10 is made up of a rigid back panel 20 and relatively wide face panel 22, the latter being hinged at its upper edge to the back panel 20 and extending downwardly therefrom. The component 12 is a rigid panel 24 connected along one edge by a hinge 26 to the panel 20 and extending downwardly and forwardly therefrom. Facing strips 28—28 are hinged to the lower edge of the panel 20 and extend therefrom downwardly along the upper surface of the panel 24 to its lower edge. The upper edge of a faceboard 18 is connected to the panel 22 by hinges 34—34 situated intermediate the upper and lower edges of the panel 22. The lower edge of the faceboard 18 is connected to the panel 24 by a leaf 36 which in turn is connected by hinges 38 and 40 to the faceboard 18 and the panel 24 respectively.

A brace 14 is connected to the panel 24 so that it may be bent downwardly about a score line 25 for interengagement with a leg 16, the latter being constituted by a rigid extension of the panel 22, extending downwardly through openings 27 and 29 in the faceboard 18 and the panel 24, respectively.

Any suitable interconnection may be provided between the brace and leg, that shown herein comprising a tongue 42 on the brace containing a semi-circular opening 44, a notch 46 at the lower end of the leg within which the tongue is adapted to be engaged and a tab 48 projecting downwardly into the notch for interengagement with the semi-circular hole in the brace.

Figure 2:
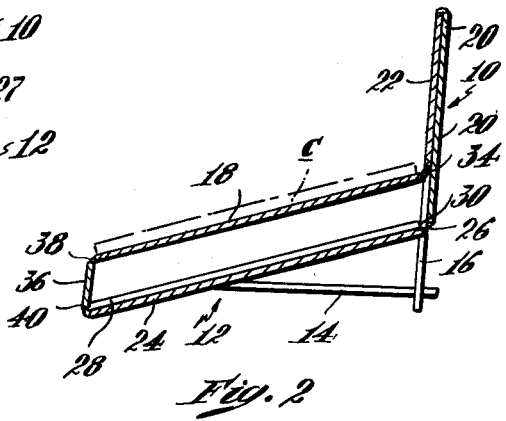
FIG. 2 is a vertical section taken on the line 2—2 of FIG. 1.
Figure 4:
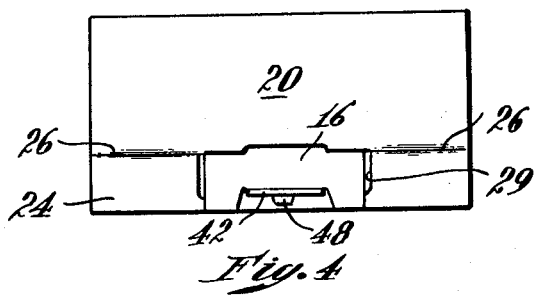
FIG. 4 is a rear view of the mount.
Figure 3:
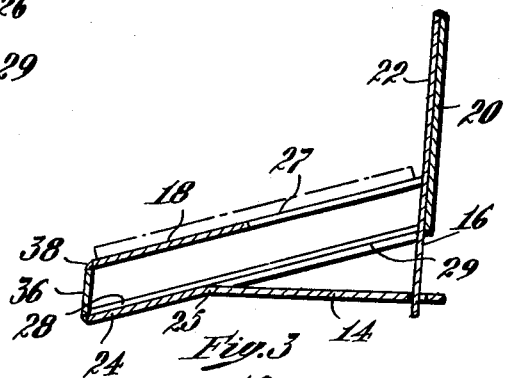
FIG. 3 is a vertical section taken on the line 3—3 of FIG. 1.
Figure 6:
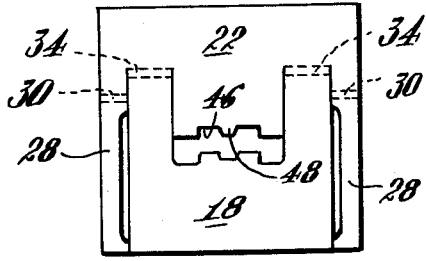
FIG. 6 is a plan view of the mount with the parts collapsed into a common plane as seen from the front side.
Figure 5:
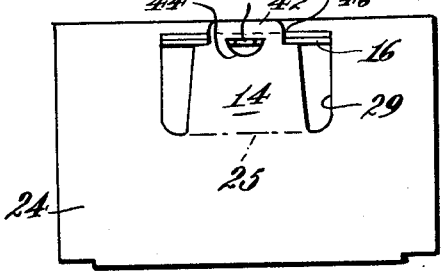
FIG. 5 is a bottom view of the mount.
Figure 7:
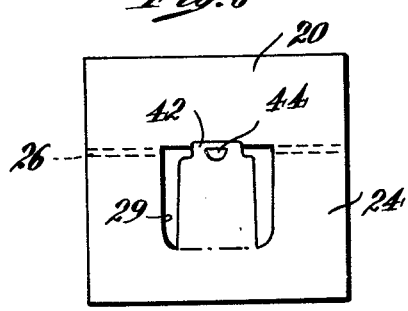
FIG. 7 is a corresponding view as seen from the back side.
Figure 8:
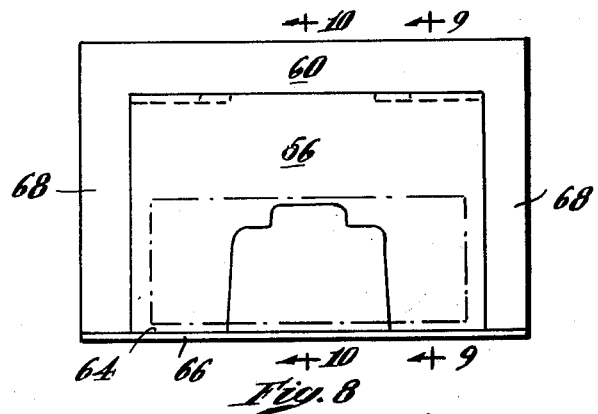
FIG. 8 is an elevation of a modified form of the mount set up in the alternate one of the two possible positions.

The hinges 26 and 34 connecting the adjacent or proximal edges of the panels 20 and 24 and the panels 22 and 18 are parallel and correspond in spacing to the hinges 38 and 40 which connect the leaf 36 to the panels 18 and 24, so that the structure is in the form of a parallelogram which may be set up from a prone position, such as shown in FIGS. 6 and 7, to that shown in FIGS. 2 and 3, by grasping the ends and folding the parts relatively to each other sufficiently to bring the brace and leg into cooperative position. Folding the parts automatically raises the faceboard 18 to a position parallel to the panel 24 and provides an elevated surface on which the calendar pad C may be supported.

In this form of the invention the faceboard 18 is inclined at a relatively flat angle with respect to the horizontal and the panel 22 projects upwardly therefrom at a fairly sharp angle. Alternatively, the structure may be repositioned, as shown in the modified structure illustrated in FIGS. 8 to 15 inclusive, to provide a support which stands upwardly from the horizontal at a much sharper angle and which may optionally provide for supporting a writing implement.

Figure 9:
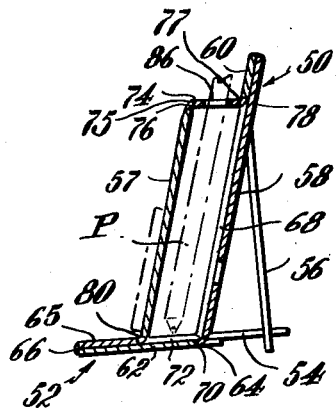
FIG. 9 is a vertical section taken on the line 9—9 of FIG. 8.
Figure 11:
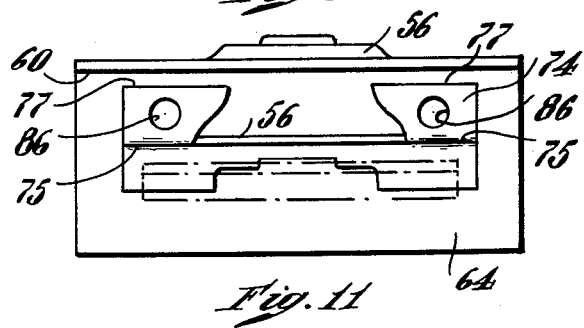
FIG. 11 is a plan view.
Figure 10:
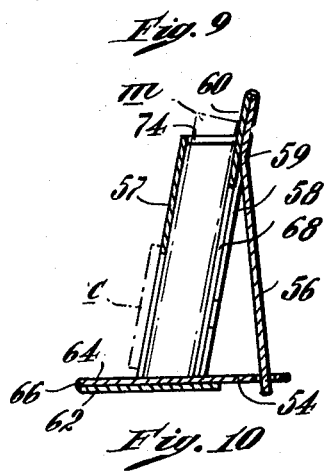
FIG. 10 is a vertical section taken on the line 10—10 of FIG. 8.
Figure 14:
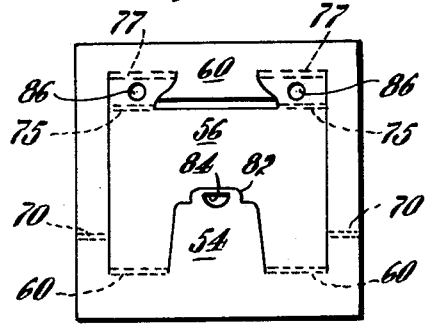
FIG. 14 is a plan view of the mount the parts collapsed into a common plane as seen from the front side.
Figure 12:
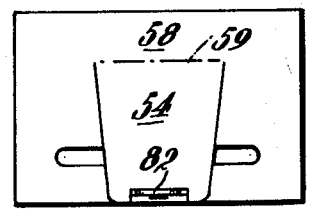
FIG. 12 is a rear view.
Figure 15:
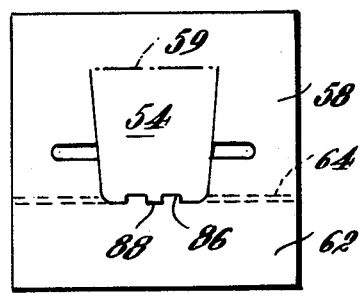
FIG. 15 is a corresponding view as seen from the back side.
Figure 13:
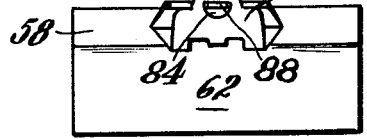
FIG. 13 is a bottom view.

In this alternative form, FIGS. 8 to 15, the mount comprises a hinged support made up of components 50 and 52 held in angular relation to each other by a brace 54 and leg 56 carried by the respective components, so as to hold one component in an upright, rearwardly inclined position and the other extending from the lower edge of the one component downwardly and forwardly, and a faceboard 57 spaced forwardly and parallel to the component 50 and connected to the respective components by hinge means. The component 50 comprises a back panel 58 and a relatively narrow face panel 60 hinged at its upper edge to the back panel 58 and extending downwardly therefrom. The component 52 comprises a rigid panel 62 connected by a hinge 64 to the lower edge of the backboard and a rigid panel 65 connected by a hinge 66 at its forward edge to the panel 62. Facing strips 68—68 extend from the face panel 60 downwardly along the opposite sides of the back panel and these are connected by hinges 70—70 to strips 72—72 extending rearwardly from the panel 64. The faceboard 57 is connected at its upper edge to the face panel 60 by transversely spaced leaves 74—74 which are connected by hinges 75, 77 to the faceboard and face panel respectively. The lower edge of the faceboard is connected by a hinge 80 to the panel 65 along a line which is spaced from and parallel to the hinge 70—70 and at a distance therefrom corresponding to the width of the leaf 74, so that the structure again constitutes a parallelogram arrangement which may be folded into a common plane or set up as shown in FIGS. 9 and 10. The brace 54 is an integral extension of the panel 65 and extends rearwardly therefrom through an opening 55 in the back panel 53 into engagement with the leg 56. The leg extends downwardly from the back panel and is deflected rearwardly therefrom on a score line 59.

The brace is provided with a tongue 82 containing a semi-circular opening 84 and the leg is provided with a notch 86 into which the tongue fits and a tab 88 for engagement with the semi-circular opening 84.

The faceboard 57, as illustrated, sets forwardly of the back panel 58 and provides a prominent support for the calendar pad c. If desired, the hinge leaves 74 may be provided with one or more vertically disposed openings 86—86 through which writing implements p may be inserted and supported between the faceboard 57 and the back panel 58. The space between the leaves may be employed to support a memorandum pad m.

The mount in each form is adapted to be made of two plies of rigid paper board hinged at adjacent edges so as to be folded at said edges into engagement with each other and joined along the remaining three edges by extensions of the facing paper on one of the panels folded over the edges of the other panel. Alternatively they may be made up of two separate panels faced on both sides with decorative paper and fastened together by adhesive.

It should be understood that the present disclosure is for the purpose of illustration only and that this invention includes all modifications and equivalents which fall within the scope of the appended claims.

I claim:

1. An easel-type calendar mount comprising two rigid panels disposed with an edge of one adjacent an edge of the other at an angle to each other, a hinge joining said edges, a first rigid strut hinged at one end to the distal edge of one panel, said first strut being disposed in contact with said one panel with its distal end extending beyond the hinge joining the panels, a second rigid strut hinged at one end to the other panel intermediate the distal end and the hinged end thereof, said second strut extending from its hinged end divergently from the panel toward the hinge joining the panels and the distal end of the first strut, means mutually cooperable at the distal ends of the struts holding the panels at said angle, and a faceboard supported at its ends by the panels in spaced parallel relation to one of the panels.

2. An easel-type calendar mount according to claim 1, wherein at least one end of the faceboard is supported in spaced relation to the distal end of its supporting panel, and wherein that portion of the strut, having contact with the panel, beyond the supported end of the faceboard corresponds in width to the panel with which it has contact and constitutes therewith a headboard for receiving advertising media.

3. An easel-type calendar mount according to claim 1, wherein the one panel and the first strut having contact therewith constitute a footing on which the mount rests, and the second strut constitutes a leg which operates to hold the second panel and the faceboard in an upright position relative to the one panel.

4. An easel-type calendar mount according to claim 1, wherein the faceboard is supported in spaced parallel relation to the second panel by a hinge element containing one or more openings through which articles may be thrust for support between the panel and faceboard.

References Cited in the file of this patent

UNITED STATES PATENTS

| | | |
|---|---|---|
| 2,206,728 | Nevins | July 2, 1940 |
| 2,954,625 | Nichols | Oct. 4, 1960 |
| 2,976,631 | Paschal | Mar. 28, 1961 |